(12) United States Patent
Lin

(10) Patent No.: US 8,590,412 B2
(45) Date of Patent: Nov. 26, 2013

(54) DRIVING APPARATUS WITH A VIBRATION LIMITER FOR WORM GEAR

(75) Inventor: Paul Lin, Tainan Hsien (TW)

(73) Assignee: Macauto Industrial Co., Ltd., Yung-Kang, Tainan Hsien (TW)

( * ) Notice: Subject to any disclaimer, the term of this patent is extended or adjusted under 35 U.S.C. 154(b) by 720 days.

(21) Appl. No.: 12/803,065

(22) Filed: Jun. 18, 2010

(65) Prior Publication Data

US 2011/0308339 A1    Dec. 22, 2011

(51) Int. Cl.
*F16H 1/16* (2006.01)

(52) U.S. Cl.
USPC .......................................... 74/425; 74/89.14

(58) Field of Classification Search
USPC ....................... 74/89.14, 425, 724
See application file for complete search history.

(56) References Cited

U.S. PATENT DOCUMENTS

| | | | | |
|---|---|---|---|---|
| 1,995,288 | A  * | 3/1935 | Acker | 184/6.12 |
| 3,735,645 | A  * | 5/1973 | Pickles | 74/606 R |
| 6,639,760 | B2 * | 10/2003 | Dyer et al. | 360/261.3 |
| 6,708,796 | B2 * | 3/2004 | Kinme et al. | 180/444 |
| 6,761,244 | B2 * | 7/2004 | Sano et al. | 180/444 |
| 7,188,700 | B2 * | 3/2007 | Eda et al. | 180/444 |
| 7,997,244 | B2 * | 8/2011 | Ito et al. | 123/90.33 |

\* cited by examiner

*Primary Examiner* — David M Fenstermacher
*Assistant Examiner* — Terence Boes
(74) *Attorney, Agent, or Firm* — Howard & Howard Attorneys PLLC

(57) ABSTRACT

A driving apparatus for operating a sunshade, includes a housing, a gear assembly, a drive unit and a vibration limiter. The drive unit 5 includes a motor with an output shaft, a worm gear connected to the output shaft and the gear assembly and having a free end section opposite to the output shaft. The vibration limiter has an embracing member disposed around the free end section to prevent the free end section from shaking. With the vibration limiter, vibration and rattling noises can be eliminated.

5 Claims, 6 Drawing Sheets

DRIVING APPARATUS WITH A VIBRATION LIMITER FOR WORM GEAR

BACKGROUND OF THE INVENTION

1. Field of the Invention

The invention relates to a driving apparatus, more particularly to a driving apparatus used for operating a sunshade and having a vibration limiter.

2. Description of the Related Art

FIGS. 1 and 2 illustrate a conventional vehicle sunshade device 1 that includes a base seat 11, a shaft 12 mounted rotatably on the base seat 11, a curtain 13 rolled around the shaft 12 and having an end rod 14 attached thereto, a pair of support rods 15 connected between the base seat 11 and the end rod 14 for unrolling the curtain 13, and a driving apparatus 16 for extending or retracting the support rods 15.

The driving apparatus 16 includes a housing 161, a gear assembly 162 mounted inside the housing 161, a pair of racks 163 disposed in parallel to each other and driven by the gear assembly 162 to move the support rods 15 in opposite directions, and a drive unit 164 for driving the gear assembly 162. The drive unit 164 includes a motor 165 and a worm gear 167 connected to an output shaft 166 of the motor 165.

When the motor 165 is activated, the worm gear 167 rotates the gear assembly 162 and thereby drives the racks 163 to move toward or away from each other. Accordingly, the support rods 15 are retracted or extended, and the curtain 13 is rolled and unrolled.

Because the worm gear 167 is assembled with the output shaft 166 of the motor 165 through a rivet connection, the worm gear 167 is likely to vibrate and rattle against a meshing gear of the gear assembly 162 during its operation due to assembly or manufacturing errors. In particular, the worm gear 167 vibrates substantially at a suspended free end 168 thereof. As a result, unbalanced motions are incurred in the gear assembly 162.

SUMMARY OF THE INVENTION

An object of the present invention is to provide a driving apparatus of the above-mentioned type with an enhancement for reducing vibration and rattling noises.

Accordingly, a driving apparatus of this invention comprises a housing, a gear assembly, a drive unit, and a vibration limiter. The gear assembly is mounted inside the housing. The drive unit includes a motor with an output shaft, and a worm gear that is connected coaxially to the output shaft and connected drivingly to the gear assembly and that has a free end section opposite to the output shaft. The vibration limiter has an embracing member disposed around the free end section to prevent the free end section from shaking during the operation of the gear assembly and the motor.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENT

Figure 1:
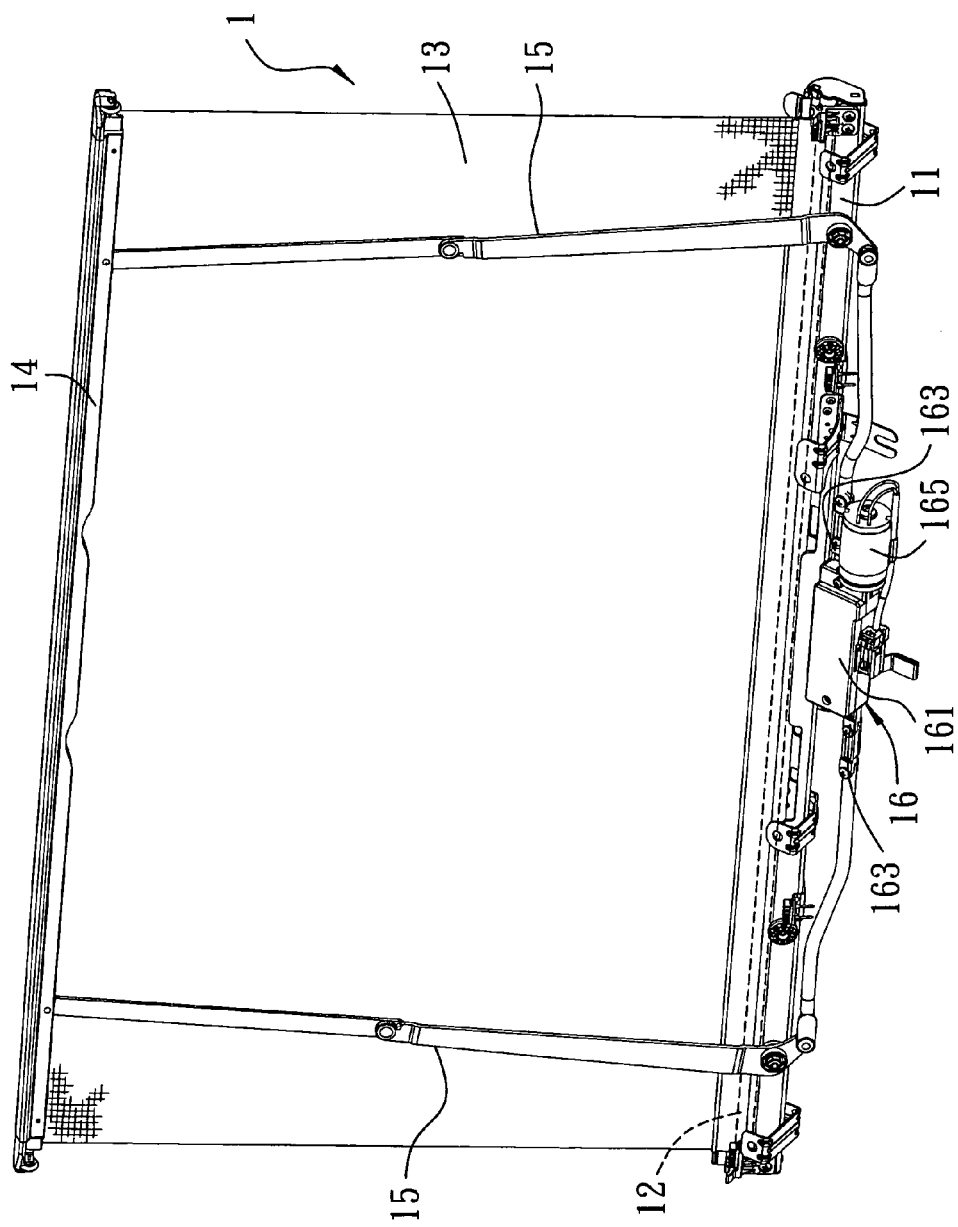
FIG. 1 is a front view of a conventional vehicle sunshade device.
Figure 2:
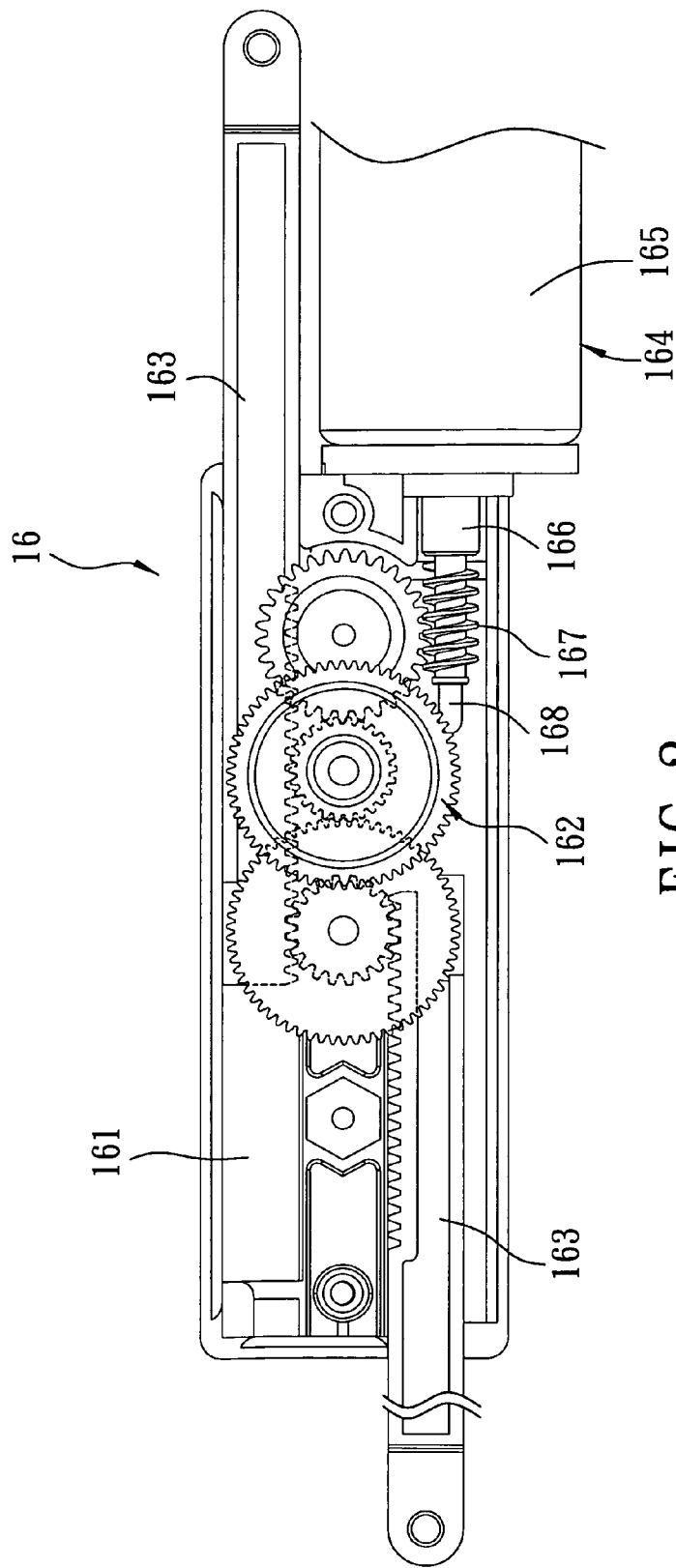
FIG. 2 is a sectional view of a driving apparatus of the conventional vehicle sunshade device.
Figure 3:
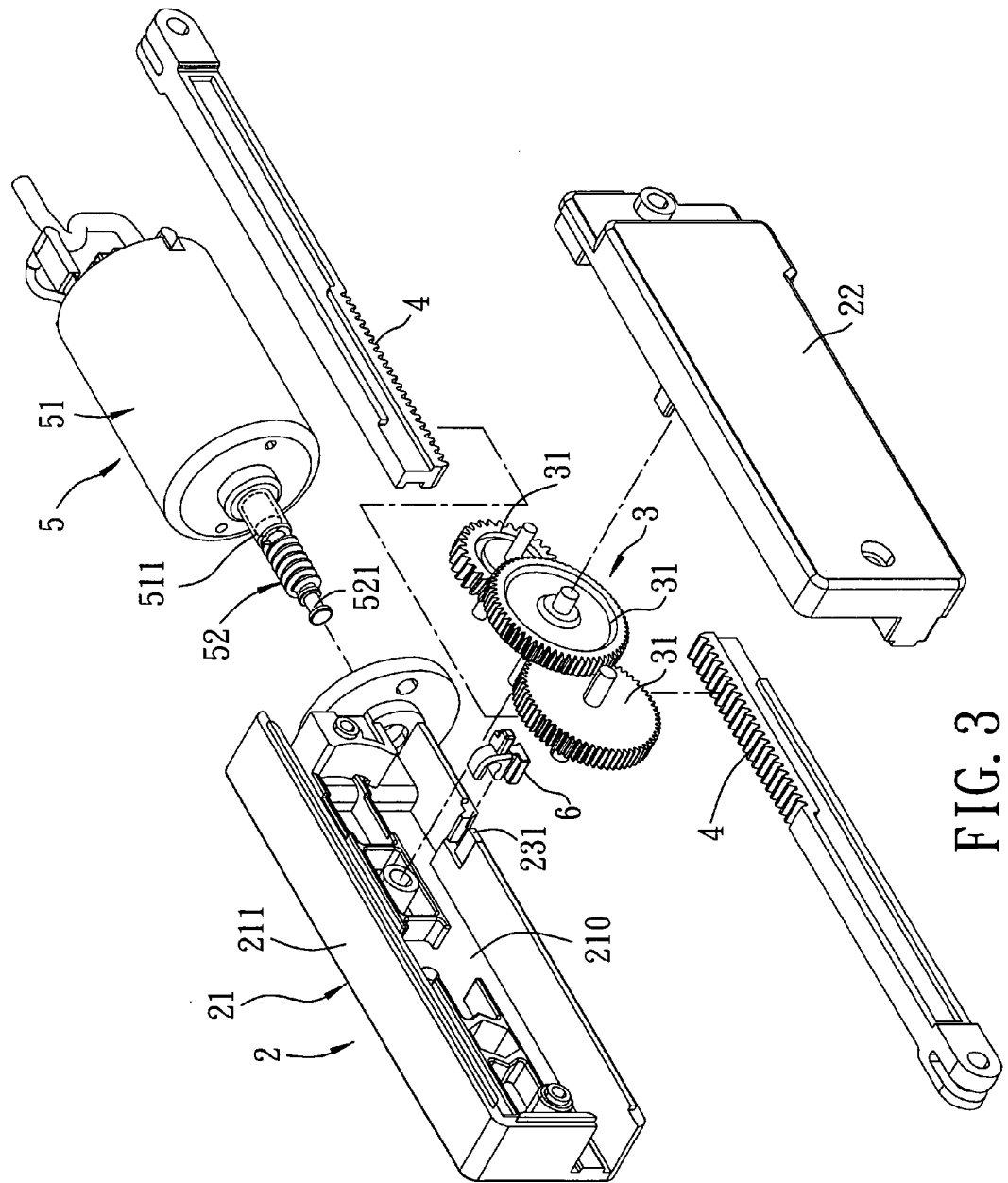
FIG. 3 is an exploded perspective view of the preferred embodiment of a driving apparatus according to the present invention.

Referring to FIG. 3, there is shown a driving apparatus embodying to the present invention which is adapted for use in a vehicle sunshade device. The driving apparatus includes a housing 2, a gear assembly 3, a pair of racks 4, a drive unit 5 and a vibration limiter 6.

The housing 2 includes first and second housing halves 21, 22 coupled to each other. The gear assembly 3 is mounted inside the housing 2 and includes a plurality of gears 31 meshing with one another. The racks 4 are disposed parallel to each other and are connected drivenly to the gear assembly 3 for moving in opposite directions.

The drive unit 5 includes a motor 51 mounted on the housing 2 and having an output shaft 511, and a worm gear 52. The worm gear 52 is connected coaxially to the output shaft 511, connected drivingly to the gear assembly 3, and has a free end section 521 opposite to the output shaft 511. The motor 51 is disposed outside the housing 2, and the output shaft 511 extends into the housing 2. The worm gear 52 is meshed with one of the gears 31.

Figure 4:
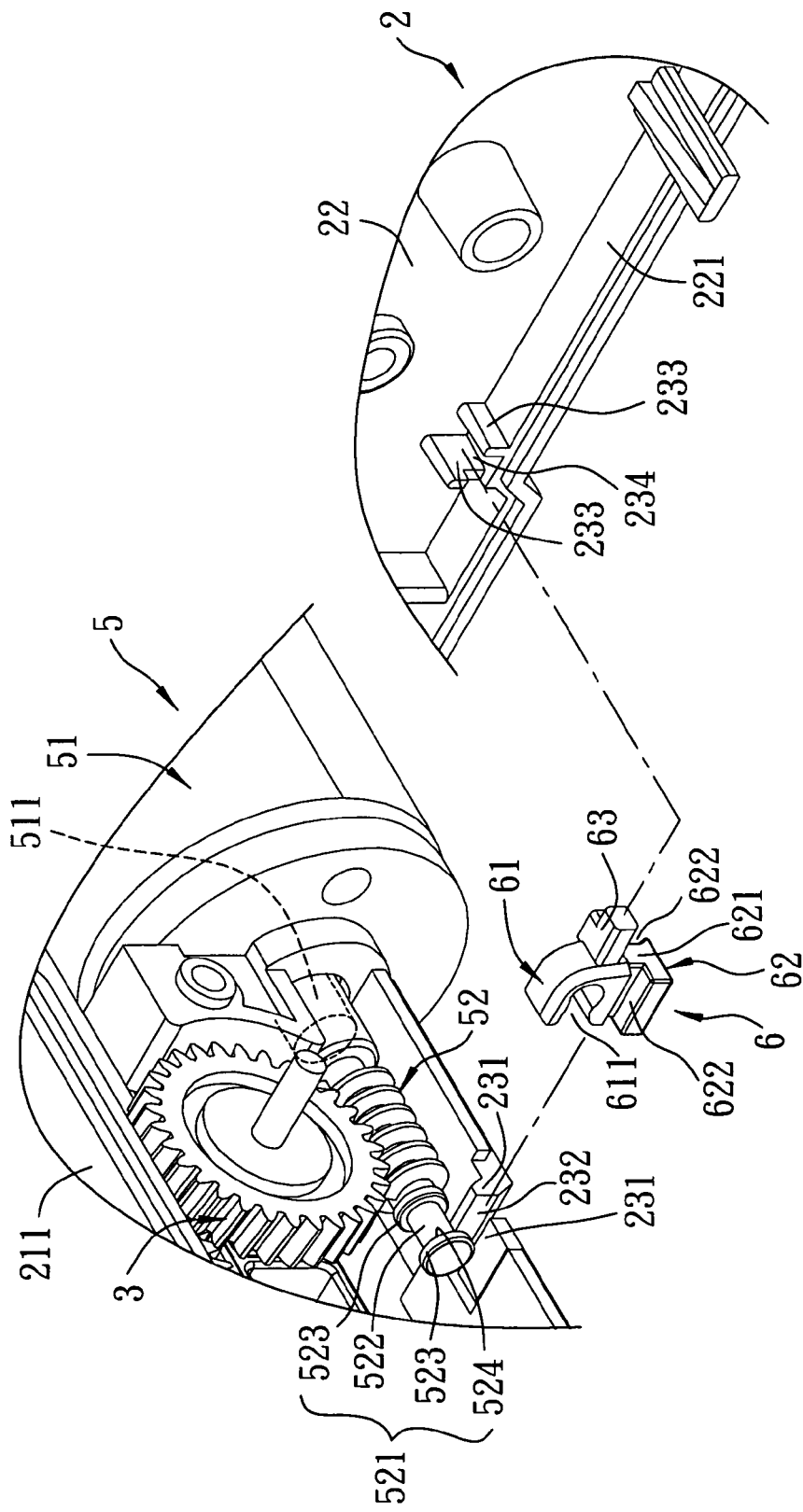
FIG. 4 is a partly exploded perspective view of the preferred embodiment.
Figure 5:
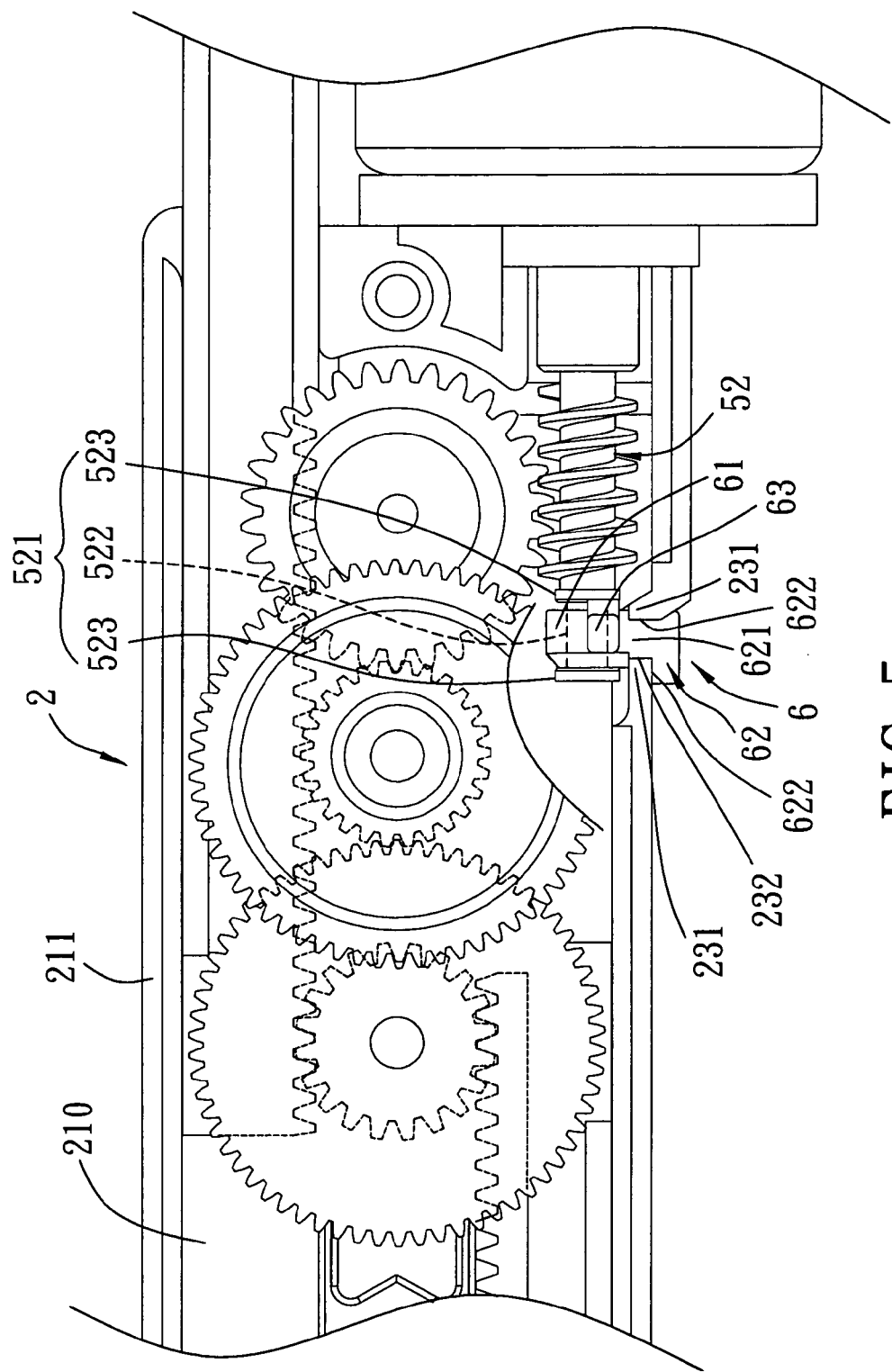
FIG. 5 is a sectional view of the preferred embodiment illustrating a vibration limiter and a drive unit inside a housing.
Figure 6:
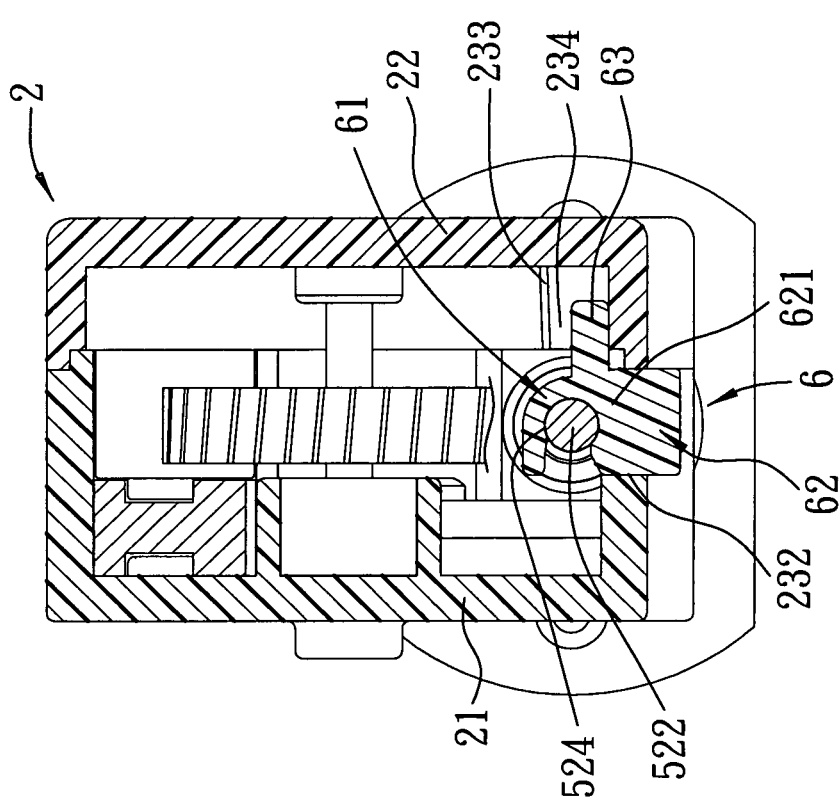
FIG. 6 is another sectional view of the preferred embodiment.

Referring to FIGS. 4 to 6 in combination with FIG. 3, the first housing half 21 has a receiving space confined by a base wall 210 and a four-sided surrounding wall 211. The surrounding wall 211 surrounds the gear assembly 3 and the worm gear 52, and has an insert groove 232 proximate to the neck 522 of the free end section 521, and a pair of spaced apart protrusions 231 projecting into the insert groove 232 in opposite directions. The second housing half 22 has a surrounding wall 221, and two resilient clamp members 233 confining a clamp groove 234.

The free end section 521 of the worm gear 52 has two axially spaced apart annular flanges 523, a neck 522 formed between the annular flanges 523, and an annular groove 524 formed around the neck 522.

The vibration limiter 6 embraces the free end section 521 of the worm gear 52 to prevent the free end section 521 from shaking during the operation of the gear assembly 3 and the motor 51. The vibration limiter 6 is a one-piece structure made of a plastic material and includes an embracing member 61, a mount 62 and a tongue 63. The embracing member 61 is substantially C-shaped and is disposed around the neck 522 of the free end section 521 within the annular groove 524. The embracing member 61 is resilient and has an insert opening 611 that permits the neck 522 to be inserted transversely into the embracing member 61 through the insert opening 611.

The mount 62 is connected to the embracing member 61 and extends to the surrounding wall 211 of the housing half 21. The mount 62 has an insert part 621, and two slide grooves 622 that extend on two sides of the insert part 621 in a direction transverse to the neck 522 and that open in opposite directions. The slide grooves 622 engage slidably and respectively the protrusions 231 when the insert part 621 is inserted into the insert groove 232. The tongue 63 projects from one side of the embracing member 61 in a direction that is opposite and transverse to the neck 522, and extends toward the second housing half 22 to be clamped by the clamp members 233.

During assembly, the gear assembly 3, the racks 4 and the drive unit 5 are mounted to the first housing half 21, the vibration limiter 6 is attached to the surrounding wall 211 by sliding the insert part 621 of the mount 62 into the insert groove 232 in a direction transverse to the free end section 511. When the insert part 621 is inserted into the insert groove 232, the slide grooves 622 of the mount 62 engage the protrusions 231, respectively, and the embracing member 61 embraces the neck 522 of the free end section 521. When the second housing half 22 is assembled to the first housing half 21, the tongue 63 of the vibration limiter 6 is extended into the clamp groove 234 and clamped by the clamp members 233.

During operation, the motor 51 rotates the worm gear 52 and the gear assembly 3, and the gear assembly 3 drives the racks 4 in opposite directions. With the use of the vibration limiter 6, vibration of the free end section 521 of the worm gear 52 can be limited so that the worm gear can rotate stably without shaking and rattling against the gear assembly 3. Accordingly, the gear assembly 3 can operate with smooth and balanced motions.

While the present invention has been described in connection with what are considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A driving apparatus for operating a sunshade comprising:
    a housing;
    a gear assembly mounted inside said housing;
    a drive unit including a motor with an output shaft, and a worm gear that is connected coaxially to said output shaft, connected drivingly to said gear assembly, and has a free end section opposite to said output shaft; and
    a vibration limiter having an embracing member disposed around said free end section to prevent said free end section from shaking during the operation of said gear assembly and said motor;
    wherein said free end section has two axially spaced apart annular flanges, a neck formed between said annular flanges, and an annular groove formed around said neck, said embracing member extending around said neck within said annular groove, said embracing member having an insert opening that permits said neck to be inserted transversely into said embracing member;
    wherein said vibration limiter further has a mount connected to said embracing member and fixed to said housing; and
    wherein said housing has first and second housing halves, said first housing half having a surrounding wall surrounding said gear assembly and said worm gear, said surrounding wall having an insert groove proximate to said free end section, said mount being inserted slidably into said insert groove in a direction transverse to said neck.

2. The driving apparatus of claim 1, wherein said mount has an insert part inserted into said insert groove, and two slide grooves formed on two sides of said insert part, said first housing half further having two spaced apart protrusions projecting to said insert groove in opposite directions and engaging slidably and respectively said slide grooves.

3. The driving apparatus of claim 1, wherein said vibration limiter further has a tongue that projects from one side of said embracing member in a direction opposite and transverse to said neck, said second housing half having a clamp groove to clamp said tongue.

4. The driving apparatus of claim 3, wherein said second housing half further has two resilient clamp members confining said clamp groove and clamping said tongue.

5. The driving apparatus of claim 1, further comprising two racks that are movable in opposite directions and that are connected drivenly to said gear assembly.

\* \* \* \* \*